US011138291B2

(12) United States Patent
Chadha et al.

(10) Patent No.: US 11,138,291 B2
(45) Date of Patent: Oct. 5, 2021

(54) ASSYMETRIC ALLOCATION OF SRAM AND DATA LAYOUT FOR EFFICIENT MATRIX MULTIPLICATION

(71) Applicant: Oracle International Corporation, Redwood Shores, CA (US)

(72) Inventors: Gaurav Chadha, San Francisco, CA (US); Sam Idicula, Santa Clara, CA (US); Sandeep Agrawal, San Jose, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/716,225

(22) Filed: Sep. 26, 2017

(65) Prior Publication Data

US 2019/0095399 A1 Mar. 28, 2019

(51) Int. Cl.
*G06F 17/16* (2006.01)
*G06F 7/523* (2006.01)
*G06F 17/12* (2006.01)
(52) U.S. Cl.
CPC .............. *G06F 17/16* (2013.01); *G06F 7/523* (2013.01); *G06F 17/12* (2013.01)

(58) Field of Classification Search
CPC ........................................................ G06F 17/16
See application file for complete search history.

(56) References Cited

U.S. PATENT DOCUMENTS

| 7,475,101 B2 * | 1/2009 | Gustavson | G06F 17/16 |
| | | | 708/200 |
| 2017/0270073 A1 * | 9/2017 | Badin | G06N 3/00 |
| 2017/0344514 A1 * | 11/2017 | Zhou | G06F 17/16 |
| 2018/0107630 A1 * | 4/2018 | Zhou | G06F 9/3895 |
| 2018/0246854 A1 * | 8/2018 | Kasagi | G06F 17/16 |

* cited by examiner

*Primary Examiner* — Chuong D Ngo
(74) *Attorney, Agent, or Firm* — Hickman Becker Bingham Ledesma LLP (57) ABSTRACT

Techniques are described herein for performing efficient matrix multiplication in architectures with scratchpad memories or associative caches using asymmetric allocation of space for the different matrices. The system receives a left matrix and a right matrix. In an embodiment, the system allocates, in a scratchpad memory, asymmetric memory space for tiles for each of the two matrices as well as a dot product matrix. The system proceeds with then performing dot product matrix multiplication involving the tiles of the left and the right matrices, storing resulting dot product values in corresponding allocated dot product matrix tiles. The system then proceeds to write the stored dot product values from the scratchpad memory into main memory.

8 Claims, 4 Drawing Sheets

ASSYMETRIC ALLOCATION OF SRAM AND DATA LAYOUT FOR EFFICIENT MATRIX MULTIPLICATION

FIELD OF THE INVENTION

The present invention relates to performing efficient matrix multiplication in architectures with scratchpad memories or associative caches using the asymmetric allocation of space for the different matrices.

BACKGROUND

Dense matrix multiplication finds uses in multiple algorithms. Recent popular uses are found in the field of machine learning, where dense matrix multiplication is required for solving systems of linear equations or performing batch training of neural networks. Improving the performance of dense matrix multiplication is also significant for applications that employ unstructured data analytics in data mining, information retrieval, and bioinformatics.

Computational matrix multiplication approaches involving very large matrices have used a tiled matrix approach—in which the matrices to be multiplied as well as the dot product matrix are represented as a set of non-overlapping tiles, and the matrix multiplication is performed at the tile level. Early tiled matrix multiplication have included accessing matrices in tiles (blocks or sub-matrices) to increase reuse of data read into faster levels of the memory hierarchy, as well as loop transformation to increase reuse and locality by working on tiles of matrices instead of rows or columns alone. Recent approaches for efficient matrix-matrix multiplication recommend tiling for the cache hierarchy. Commonly used high-performance libraries use similar approaches as well. Dividing a matrix into blocks/tiles has also been found useful in graphical processing using graphical processing units (GPUs) even with additional considerations like the number of threads in a thread block.

The above mentioned approaches use $O(n^3)$ arithmetic operations (assuming n×n matrices). There are asymptotically better matrix-matrix multiplication algorithms like Strassen's algorithm with a performance of $O(n^{2.8074})$, Coppersmith-Winograd algorithm $O(n^{2.3755})$ further improved by Francois Le Gall to $O(n^{2.3729})$. These algorithms, while asymptotically better, have large constant factors and are difficult to tune for performance on modern architectures. The conventional $O(n^3)$ algorithm with efficient tiling leads to better performance, at least for smaller sub-matrices.

Computational approaches for matrix multiplication have primarily focused on optimizing the computations. This is because matrix multiplication has been viewed as a compute-bound problem. However, given that the computational power of processors has increased exponentially (especially when supplemented by co-processors/accelerators) while memory latencies have not, minimizing memory access costs is equally important. This is particularly relevant with modern architectures involving scratchpad or static random-access memory (SRAM). These memories are located close to the processing units, similar to cache architectures, but, unlike typical cache architectures, offer application programmers control over the SRAM or scratchpad memory management. Exploiting such an architecture for matrix multiplication to improve performance is the presented herein.

The approaches described herein are approaches that could be pursued, but not necessarily approaches that have been previously conceived or pursued. Therefore, unless otherwise indicated, it should not be assumed that any of the approaches described in this section qualify as prior art merely by virtue of their inclusion herein.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview: Matrix Multiplication

Embodiments described herein present approaches to perform efficient matrix multiplication by using a scratchpad-based architecture. In such an architecture, the processor has a private "scratchpad memory". Each scratchpad memory may be a software managed cache with simple hardware Direct Memory Access (DMA) support. The scratchpad memory is used in a manner that facilitates asymmetric allocation of scratchpad memory space for the two input matrices as well as the resulting product matrix.

Basic matrix multiplication is a non-commutative binary operation that computes a dot product matrix of two input matrices. Basic dot product matrix multiplication is shown below. Input matrix A is an m×n matrix with m rows and n columns. Input matrix B is an n×p with n rows and p columns. The resulting matrix product matrix C is an m×p matrix with m rows and p columns. Each entry in the dot product matrix C is obtained by multiplying n entries of a row of matrix A with the n entries of a column of matrix B. Specifically, Basic Matrix Multiplication $$A = \begin{pmatrix} A_{11} & A_{12} & \cdots & A_{1n} \\ A_{21} & A_{22} & \cdots & A_{2n} \\ \vdots & \vdots & \ddots & \vdots \\ A_{m1} & A_{m2} & \cdots & A_{mn} \end{pmatrix}, \quad (1)$$

$$B = \begin{pmatrix} B_{11} & B_{12} & \cdots & B_{1p} \\ B_{21} & B_{22} & \cdots & B_{2p} \\ \vdots & \vdots & \ddots & \vdots \\ B_{n1} & B_{n2} & \cdots & B_{np} \end{pmatrix}$$

Dot Product Matrix, $C_{ij} = \sum_{k=1}^{n} A_{ik} B_{kj}$, for dot product matrix element at row $i$ and column $k$ As denoted in Equation 1, for a dot product element at row i and column j in the product matrix C, row i of matrix A and column j of matrix B are termed to be corresponding to each other with respect to the dot product computation.

Tile-based matrix multiplication involves performing the above-described basic matrix multiplication by splitting the two input matrices into a set of non-overlapping sub-matrices, called tiles. The matrix multiplication is performed on the smaller tiles, and the product matrix is computed by accumulating the sums for individual elements in the resultant product matrix.

Typically, multiple memory accesses as well as non-sequential memory accesses cause significant performance deterioration in computational matrix multiplication. Efficiency of tile-based matrix multiplication is improved by reading tiles of the input matrices into a fast memory close to the processing units, and performing the matrix multiplication on corresponding tiles in such a manner as to increase reuse of individual elements once they are read into the fast memory. Efficiency is further improved by designing the tile-based matrix multiplication to reduce non-sequential memory access.

Figure 1:
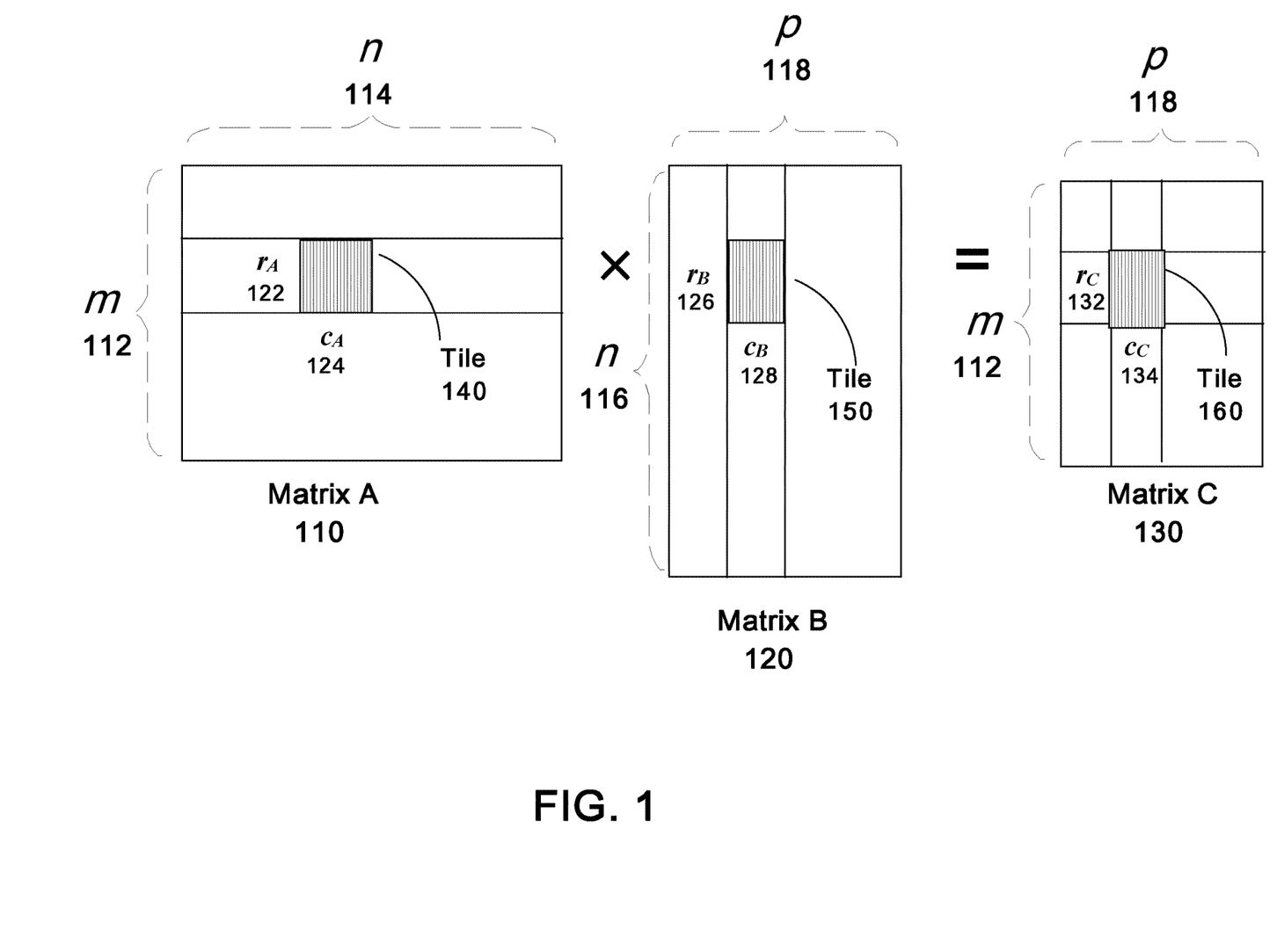
FIG. 1 is a diagram depicting tile-based matrix multiplication according to an embodiment.

FIG. 1 depicts a tile-based matrix multiplication. As shown for basic matrix multiplication, input Matrix A 110 is an m×n matrix with m rows 112 and n columns 114. Input Matrix B 120 is an n×p matrix with n rows 116 and p columns 118. Product Matrix C 130 is an m×p matrix with m rows 112 and p columns 118. A Tile 140 of matrix A is an $r_A \times c_A$ matrix with $r_A$ rows 122 and $c_A$ columns 124. A Tile 150 of matrix B is an $r_B \times c_B$ matrix with $r_B$ rows 126 and $c_B$ columns 128. A Tile 160 of product matrix C is an $r_C \times c_C$ matrix with $r_C$ rows 132 and $c_C$ columns 134.

Tile-based multiplication of the two matrices A and B involves reading the tile of matrix A 140 and the tile of B 1500 into scratchpad memory, performing the matrix multiplication of the two tiles by computing the dot product values between rows of Tile 140 of matrix A and corresponding columns of the corresponding Tile 150 of matrix B to yield a partial result for the corresponding product Tile 160 of matrix of C. Thus, the complete product tile 160 of matrix C is produced by, for each element in a tile of matrix C, accumulating the sum over a row of matrix A and a corresponding column of matrix B as contained within the tiles of matrices A and B that are read in to the scratchpad memory.

In embodiments described herein, particular tiles of matrices A, B, and C may be considered to be corresponding tiles when, a row of the particular tile of matrix A and a column of the particular tile of matrix B contribute either partially or wholly to obtaining the dot product at an element of matrix C, and is be stored in the particular tile of matrix C during dot product computation.

In performing matrix multiplication, there is a fixed amount of scratchpad memory, and a fixed memory bandwidth. To maximize memory bandwidth efficiency during computation, the parameters to be minimized are data that is read in to scratchpad memory and written out to main memory. In terms of reading in data from main memory, a minimum requirement is to read in each of matrices A and B entirely at least once, and write out the product matrix C at least once. Within the tile-based matrix multiplication computation, maintaining attention to this requirement involves minimizing the number of times a tile of A or B is read into scratchpad memory and the number of times a tile of matrix C is written out to main memory and re-read back into scratchpad memory to further update that tile.

In embodiments disclosed herein, matrix B is assumed to be the smaller matrix, i.e., np<mn, and the tile-based matrix multiplication is anchored around matrix B. The algorithms described herein are structured so that a tile of matrix B is read into scratchpad memory only once. Corresponding tiles of matrices A and C are read into scratchpad memory, possibly multiple times, and the corresponding tiles of matrix C may be written out to main memory more than once.

While the embodiments disclosed herein are specifically described assuming that matrix B is the smaller matrix, they are equally and symmetrically applicable to the case wherein matrix A may be the smaller matrix, i.e., mn<np. In such a case, the structure of the algorithm is symmetrically modified so that a tile of matrix A is read into scratchpad memory once and the corresponding tiles of matrices B and C are read into scratchpad memory, possibly multiple times, and the corresponding tiles of matrix C may be written out to main memory more than once.

Henceforth embodiments described herein assume that matrix B is the smaller matrix.

The concept of reuse of tiles is closely tied with the access pattern of tiles of matrix A. For a tile of matrix B 240 that is read into scratchpad memory, all corresponding tiles of matrix A from tile row 230 are read into the scratchpad memory one after another. The matrix multiplication is performed between the tiles, and the partial sums leading to the complete dot product for an element are accumulated in a corresponding tile of product matrix C. Such a multiplication ensures complete reuse of a tile of matrix B, so that particular tile of matrix B never has to be accessed again. Following this algorithm, tile of matrix B 240 is read only once, whereas, a tile of matrix A 230 is read as many times as the number of tile columns of matrix B. A tile of Matrix C 250 may both read and written as many times as the number of tiled columns of A.

Asymmetrical Allocation of Space

The size of a tile is at least the minimum amount of data that needs to be transferred to achieve maximum direct memory access bandwidth (e.g. bytes/second) while reading the tile from the main memory into the scratchpad memory. Allocating space symmetrically to house tiles of all matrices involves allocating equal space in the scratchpad memory for each tile of all the matrices. This is not the most optimal allocation since it may lead to more reads from the main memory than is necessary; this is especially the case when one of the input matrices to be multiplied is much smaller than the other matrix.

In embodiments disclosed herein, space in the scratchpad memory is allocated asymmetrically to individual tiles of the left matrix A, the right matrix B, and the product matrix C. Asymmetric allocation implies that the space allocated for each tile of a matrix is not equal for all the matrices. The specific space allocation decisions are made for the shape of a tile as well as for the size of a tile. The factors depend, but not limited to, the relative sizes of matrices A and B, the size of the scratchpad memory, as well as the relative sizes of the columns of a tile of matrix B and a tile of the product matrix C.

Several cases arise regarding allocating space to tiles of the individual matrices and these cases are described further below:

The following notation is used:

T: Denotes the minimum of data that needs to be transferred by the DMA engine to achieve maximum possible bandwidth, also termed peak bandwidth $r_X$: Number of rows in a tile of matrix X, where X is any of matrices: A, B or C
$c_X$: Number of columns in a tile of matrix X
$S_Y$: Size of entity Y, where Y is any of: matrices, tiles or scratchpad memory
$d_X$: main memory traffic due to matrix X
$d$: Total main memory traffic $$S_B = r_B c_B \quad (2)$$

$$S_A = r_A c_A \quad (3)$$

$$S_C = r_C c_C \quad (4)$$

$$S_{SM} = S_B S_A + S_C \quad (5)$$

In the embodiments disclosed herein, it is assumed that the matrices are stored in a row-major format, and that matrix B is the smaller matrix. It is reiterated that the following holds true symmetrically for column-major format or matrix A being the smaller matrix. There are two cases:

Case 1: Matrix B is small enough to fit entirely in the scratchpad memory, along with a tile each of matrix A and matrix C of size T. The tile sizes for matrices A and C need to be above the minimum threshold with respect to the peak bandwidth.

In this case, along with entire matrix B, tiles of matrix A, each tile with $r_A$ rows and $c_A$ columns, are read in a row-major fashion along a tile-row of matrix A. Within each tile that is read in, the rows are stored contiguously in scratchpad memory. The matrix multiplication involves multiplying a row of the tile of matrix A that has been read in with a corresponding column of matrix B, thereby accumulating the partial results for the dot product in corresponding tile elements of matrix C. A tile of matrix C is written out only when it is completely contains the dot product at each element in the tile. Therefore, each tile of matrix C has to be written out only once.

If at least one row of matrix A entirely fits in a tile, no partial sums are generated and C is written out to DRAM once. If a complete row of matrix A does not fit, rows of matrix A are read in parts, reading a tile row completely in row-major fashion before moving on to the next tile row. The resultant dot product element of matrix C is updated as many times as there are tile-columns of A. However, these updates are to elements of matrix C that are residing in the scratchpad memory. A tile of matrix C is written out from the scratchpad memory into main memory only when the dot product is complete for the entire tile of matrix C. Matrix A is read in tiles of $c_A$ columns, where $c_A <= n$, where n is the number of columns of matrix A.

The algorithm for performing the tile-based matrix multiplication when Matrix B is small enough to fit entirely in the scratchpad memory, along with a tile each of matrix A and matrix C of size T is termed the Case 1 Algorithm.

The pseudo-code below depicts the Case 1 Algorithm:

---
Case 1 Algorithm: Pseudo-Code
---
1. Read B into SM
2. For each row of A [m iterations]
    a. For each $c_A$ columns in a row [$n/c_A$ iterations]
        i. Read $c_A$ columns of A into SM
        ii. For each column of B
            ($c_A$ corresponding elements) [p iterations]
                1. Compute dot product and update value of C
    b. Write row of C to DRAM Thus, matrices A and B are read only once into the scratchpad memory, and matrix C is written out once. Thus, total DRAM traffic, d, in this case is $$d = \underbrace{np}_{B} + \underbrace{mn}_{A} + \underbrace{mp}_{C} \quad (6)$$

Here, matrix A contributes mn of the total traffic, matrix B contributes np of the total traffic and matrix C contributes mp of the total traffic.

Case 2: Matrix B does not entirely fit into the scratchpad memory. In this case matrix B is read into the scratchpad memory in tiles of size $r_B \times c_B$, matrix A is read into the scratchpad memory in tiles of size $r_A \times c_A$, while product matrix C is read in and written out in tiles of size $r_C \times c_C$. It is noted that, unlike in Case 1, since partial results will be generated, tiles of matrix C will need to be written out and read into the scratchpad memory. In general, given Equation 1, it follows that it is inefficient to read in more columns of matrix A than the minimum of the DMA bandwidth and the number of rows of tile B that has been read into the scratchpad memory. Similarly, it is inefficient to read in more columns of matrix C than the minimum of the DMA bandwidth and the number of columns of tile B that has been read into the scratchpad memory. Thus, the following equations hold, with special cases discussed thereafter.

$$c_A = \min(r_B, T) \quad (7)$$

$$c_C = \min(c_B, T) \quad (8)$$

Case 2a: $c_C < c_B$, i.e., the number of columns in a tile of matrix C is less than the number of columns in a tile of matrix B.

In this case, having read a particular tile of B into the scratchpad memory, all tiles of matrix A which are used in the matrix multiplication with the particular tile of B are read in sequentially, and the partial results are generated. The partial product value of each is accumulated into the corresponding tile of matrix C. In this case, the tiles of matrix C are read in and written out as needed between the scratchpad memory and the main memory.

The algorithm for performing the tile-based matrix multiplication when Matrix B does not fit entirely into the algorithm and $c_C < c_B$ is termed the Case 2a Algorithm.

The pseudo-code below depicts the Case 2a Algorithm:

---
Case 2a Algorithm: Pseudo-Code
---
For each $r_B \times c_B$ tile of B [$np/r_B c_B$ iterations]
    a. Read tile of B into SM.
    b. For each $r_A \times c_A$ tile of A in
        corresponding $r_B$ columns of A [$mr_B/r_A c_A$ iterations]
        i. Read tile of A into SM
        ii. For each $r_C \times c_C$ tile of C in corresponding $r_A$
            rows and $c_B$ columns of C [$r_A c_B / r_C c_C$ iterations]
            1. Read tile of C into SM
            2. Compute dot product and update value of C
            3. Write tile of C to main memory In some embodiments described herein, the total DRAM traffic, d, is evaluated in this case for the different matrices as follows:

The total traffic generated for matrix B is computed as follows:

The size of matrix B is np. For matrix B, each tile of matrix B has a size of $r_B c_B$. Therefore, the number of tiles of matrix B that is read is $$\frac{np}{r_B c_B}.$$

Thus, the total traffic for matrix B, i.e., the traffic including bytes read into scratchpad memory and written out to main memory is:

$$d_B = \left(\frac{np}{r_B c_B}\right)(r_B c_B) = np \qquad (9)$$

The total traffic generated for matrix A is computed as follows:

Each tile of matrix A has a size of $r_A c_A$. For each tile of matrix B, all tiles of A that are relevant for performing the matrix multiplication need to be read into the scratchpad memory. There are $$\frac{np}{r_B c_B}$$

tiles of matrix B. For each tile of matrix B that is read into scratchpad memory, $r_B$ columns of matrix A need to be read in to perform the matrix multiplication. In terms of tiles of matrix A that will need to be read in, this is $$\frac{m r_B}{r_A c_A}$$

tiles of matrix A. The total number of tiles of matrix A that is read is $$\frac{np}{r_B c_B} \frac{m r_B}{r_A c_A}$$

tiles. Thus, the total traffic for matrix A, i.e., the traffic (for e.g., bytes) that is read into scratchpad memory and written out to main memory is:

$$d_A = \left(\frac{np}{r_B c_B}\right)\left(\frac{m r_B}{r_A c_A}\right)(r_A c_A) = mn\frac{p}{c_B} = mn\frac{p r_B}{S_B} \qquad (10)$$

The total traffic that is generated for matrix C is computed as follows:

There are $$\frac{np}{r_B c_B}$$

tiles of matrix B. The number of tiles of matrix A brought in is $$\frac{m r_B}{r_A c_A}.$$

For each tile of matrix A and each tile of matrix B, the number of partial sums of matrix C that are produced is: $r_A$ rows of C and $c_B$ columns of matrix C. The number of tiles of matrix C generated for each tile of matrix A and each tile of matrix B is $$\frac{r_A c_M}{r_C c_C}.$$

Additionally, the same number of tiles are written out as well. Hence the total traffic for matrix C, i.e., the traffic read into scratchpad memory and written out to main memory is:

$$d_C = \left(\frac{np}{r_B c_B}\right)\left(\frac{m r_B}{r_A c_A}\right)\left(\frac{r_A c_B}{r_C c_C}\right)(2)(r_C c_C) = 2mp\frac{n}{c_A} \qquad (11)$$

The following inequalities hold as well.

$$c_A \le r_B$$

$$c_C < c_B$$

$$r_C \le r_A \qquad (12)$$

The total traffic is then calculated as:

$$d = d_B + d_A + d_C \qquad (13)$$

Minimizing the total DRAM traffic, d, yields the optimal values for tile sizes. This, in turn, results in optimal allocation of space in the scratchpad memory.

In the case that there is enough scratchpad memory capacity, it can be assumed that the number of columns in a tile of matrix A, i.e., $c_A$ is the maximum possible. The maximum number of elements that can be read in a row of a tile of matrix A, $c_A$, cannot exceed the number of elements in a column of a tile of matrix B, or $c_A = r_B$. Therefore, the expression for d from Equation 13 can be re-written using Equations 9, 10, and 11 as:

$$d = np + mn\frac{p}{c_B} + 2mp\frac{n}{r_B} \qquad (14)$$

From Equation 14, it is clear that minimizing the total DRAM traffic, d, implies maximizing $c_B$ and $r_B$. This, in turn, implies that matrix B is allocated as much space in the scratchpad memory as possible, having allotted at least T space to each A and C, i.e. $S_B$ is constant. Replacing $c_B$ with $S_B/r_B$, Equation 14 is rewritten as $$d = np + mn\frac{p r_B}{S_B} + 2mp\frac{n}{r_B} \qquad (15)$$

Minimizing d analytically, by equating its first order differential to zero, $$r_B = \sqrt{2 S_B} \qquad (16)$$

This means that the optimal shape of the tile size for a tile of matrix B satisfies the ratio $r_B$=2:1. This rectangle defines the shape of a tile of matrix B for optimal DRAM traffic under the assumption that that a matrix B is allocated as much space as possible in the scratchpad memory. If $c_A < r_B$, i.e., the number of columns in a tile of matrix A is strictly less than the number of rows in a tile of matrix B, the Case 2a algorithm is analyzed to minimize the total DRAM traffic d. In the Case 2a algorithm, since matrix C is accessed in the innermost loop, the tile size for matrix C is factored out, and therefore is chosen to be the smallest possible size, $S_C$=T, the peak bandwidth. The number of rows in a tile of matrix A, i.e., $r_A$, does not appear in Equation 15 for total DRAM traffic, so, for the purposes of the analysis, is temporarily be assumed to be 1 while minimizing d. Thereafter, upon arriving at a value for $c_A$, $r_A$ is increased so that $S_A$ is at least T (or close to T). The equation for d is minimized using iterative optimization techniques like a gradient descent algorithm.

Case 2b: $c_C$=$c_B$, i.e., the number of columns in a tile of matrix C is equal to the number of columns in a tile of matrix B.

Since the number of columns of a tile of matrix C is equal to the number of columns of a tile of matrix B, all partial sums that are generated in the tile of matrix C during the tile multiplication can be written out to main memory just once. Thus, having read a tile of B, all tiles of C which are produced as a result of computations involving this tile of B, are read and written out one by one. For each tile of B and C, all tiles of A, computing with this tile of B and producing results into this tile of C, are read one by one.

The algorithm for performing the tile-based matrix multiplication when Matrix B does not fit entirely into the algorithm and $c_C$=$c_B$ is termed the Case 2b Algorithm. The Case 2b algorithm differs from the Case 2a algorithm ($c_C$<$c_B$) in that tiles of C are not brought in more than once.

The pseudo-code below depicts the Case 2b Algorithm:

---

Case 2b Algorithm: Pseudo-code

---

1. For each $r_B \times c_B$ tile of B [np/$r_B c_B$ iterations]
    a. Read tile of B into SM.
    b. For each $r_C \times c_B$ tile of C in
       corresponding (w.r.t. tile of B) $c_B$ columns of C [m/$r_C$ iterations]
        i. Read tile of C into SM
        ii. For each $r_A \times c_A$ tile of A in corresponding (w.r.t. tile of C) $r_C$ rows and $c_B$ columns of A [$r_C r_B$/$r_A c_A$ iterations]
            1. Read tile of A into SM
            2. Compute dot product and update value of C
        iii. Write tile of C to DRAM

---

In the Case 2b algorithm, however, the total traffic does not change and the total DRAM traffic continues to be generated as described for Case 2a above, and is shown below:

$$d_B = \frac{np}{r_B c_B} r_B c_B = np \quad (9)$$

$$d_A = \frac{np}{r_B c_B} \frac{m}{r_C} \frac{r_C r_B}{r_A c_A} r_A c_A = mn \frac{p}{c_B} \quad (10)$$

$$d_C = \frac{np}{r_B c_B} \frac{m}{r_C} 2 r_C c_B = 2mp \frac{n}{r_B} \quad (11)$$

$c_A \le r_B$,
$r_A \le r_C$
$d = d_B + d_A + s_C$

Similar to Case 2a, the total DRAM traffic, d, is minimized analytically, yielding the same expression as in Equation 16:

$$r_B = \sqrt{2 S_B}$$

Both Case 2a and Case 2b can be considered before deciding on the final loop structure in executing the algorithm.

Computing the Dot Product of Two Input Matrices Using a Scratchpad Memory Architecture: A Summary In summary, the complete algorithm to perform matrix multiplication of two input matrices, A and B, to obtain the product matrix, C consists of the following operations: (i) receiving a left matrix A and a right matrix B, (ii) allocating asymmetric memory space in a scratchpad memory close to the processor for a tile from each of matrix A and matrix B, and tile of the dot product matrix C, (iii) for each tile of matrix A and corresponding tile of matrix B, computing the dot product of the tiles and storing it in a corresponding tile of matrix C, and (iv) writing out the tile of the dot product matrix C into main memory.

Note that is the above summary, in operation (iii), depending on the size of the matrices, and the size of the scratchpad memory, any of Case 1, Case 2a, and Case 2b as described in embodiments herein may be applicable.

Figure 2:
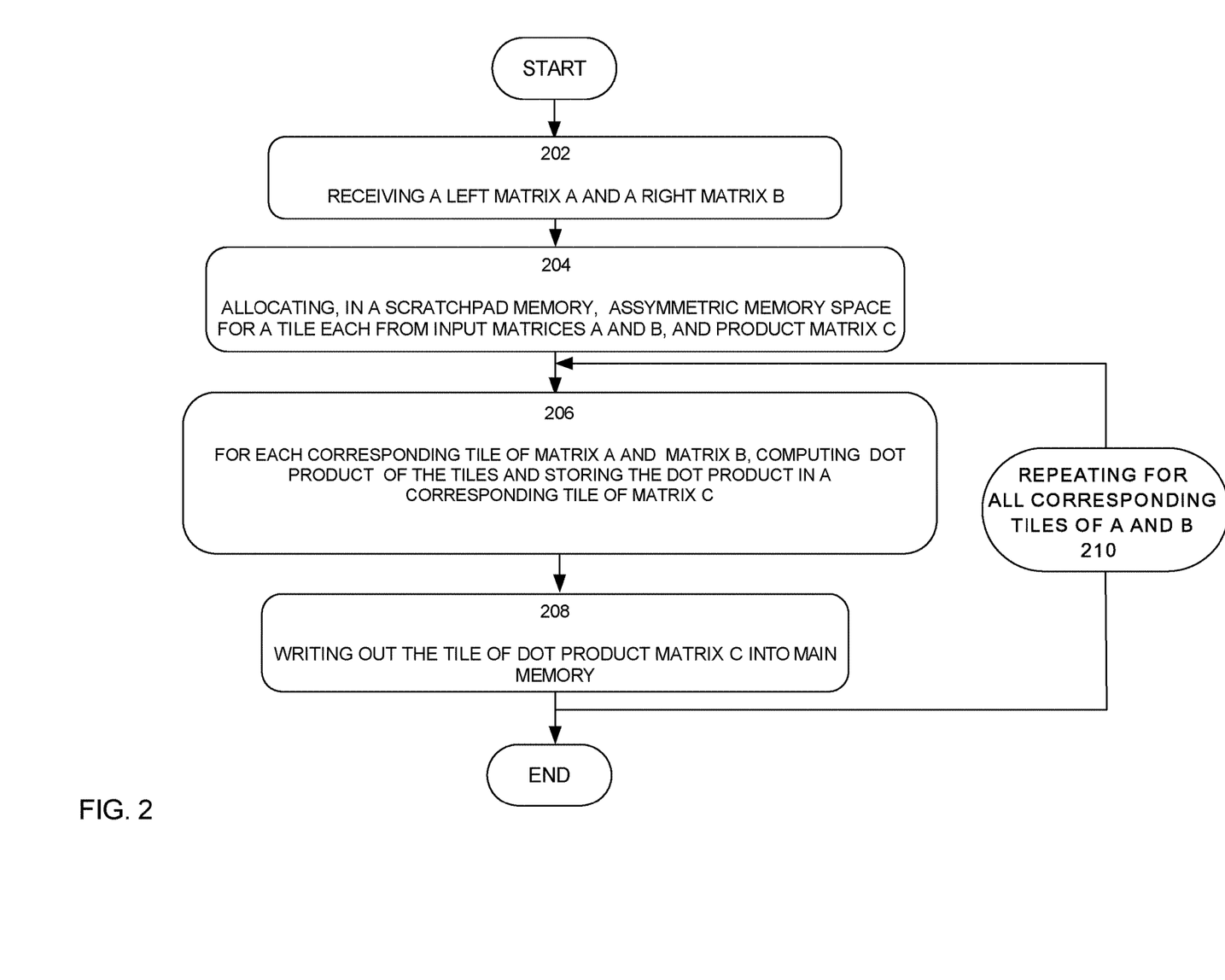
FIG. 2 is a flowchart depicting the steps of matrix multiplication according to an embodiment.

FIG. 2 depicts the flowchart of the above four operations in computing the dot product of two matrices using a scratchpad memory.

In the first operation, 202, two input matrices, a left matrix A and a right matrix B are received In the next operation, 204, space is allocated in a scratchpad memory that is close to the processor for a tile each of input matrices A and B as well as a tile of the product matrix C. The allocated space is asymmetric with respect to each of the tiles.

In the subsequent operation, 206, for corresponding tiles of matrix A and a matrix B, the dot product of the two tiles is computed and stored in a corresponding tile of matrix C.

Next, in operation 208, each tile of the dot product matrix C is written out into main memory.

Finally, as depicted in operation 210, the operations 204 and 208 are performed for all the corresponding tiles of matrix A and matrix B.

EXAMPLES COMPARING SYMMETRIC AND ASYMMETRIC ALLOCATION

Two examples are presented below comparing the total DRAM traffic generated for asymmetric and symmetric tile allocation in the scratchpad memory:

Example 1

Parameter values in this example are chosen to represent those values typically found in matrix multiplication applications such as for deep neural networks:

Matrix A is an m×n matrix
Matrix B is an n×p matrix
Values of m, n, and p are:

$m=2^{20}$, $n=2^{13}$, $p=2^{14}$

Size of the scratchpad memory, $S_{SM}$=32 KB=$2^{15}$ B
Peak memory bandwidth, T=1 KB
When employing asymmetric allocation, the following holds true:

Space of size T is allocated for tiles of matrix A and matrix C each.

Given that the scratchpad memory size is 32 KB, remaining 30 KB are allocated for tiles of matrix B, i.e. $S_B$=30 KB.
Applying Equation 16, $r_B = \sqrt{(2 S_B)}$ for minimal DRAM traffic, $r_B = 2^6\sqrt{15}, c_B = 2^5\sqrt{15} B$ Making $c_A = r_B$, $r_A = 2^4\sqrt{15}, c_A = 2^6\sqrt{15} B$ Making $c_C = c_B$, $r_C = 2^5/\sqrt{15}, c_C = 2^5\sqrt{15}B$ Applying Equation 15, the total DRAM traffic for asymmetric allocation of the scratchpad memory is $d(\text{asymmetric}) = 8461 \times 2^7 T^2 B$ When employing symmetric allocation of the scratchpad memory to tiles of matrices A, B, and C, the following holds true:

$S_X = S_{SM}/3 (X = A, B, C)$

Assuming square tiles, $r_X = c_X = \sqrt{S_X}$

Applying Equation 15, the total DRAM traffic for symmetric allocation of the scratchpad memory is $d(\text{symmetric}) = 15051 \times 2^7 T^2 B$, Thus, in Example 1, it is clear that d(asymmetric) is nearly half of d(symmetric) allocation.

Example 2

Parameter values in this example are chosen to represent a similar matrix multiplication application as above, but with a much larger scratchpad memory size:
Matrix A is an m×n matrix
Matrix B is an n×p matrix
Values of m, n, and p are:

$m = 2^{20}, n = 2^{13}, p = 2^{14}$

Size of the scratchpad memory, $S_{SM} = 2$ MB+2 KB=2050 KB

Peak memory bandwidth, T=1 KB

Upon allocating T space to tiles of A and C each, 2050 KB can be allocated for tiles of B, i.e. $S_B = 2048$ K B.

Using Equation 16, i.e., $r_B = \sqrt{(2S_B)}$ for minimal DRAM traffic, $r_B = 2^{11}, c_B = 2^{10} B$ Making $c_A = T$, $r_A = 1, c_A = 2^{10} B$ Making $c_C = c_B$, $r_C = 1, c_C = 2^{10} B$ Applying Equation 15, the total DRAM traffic for asymmetric allocation of the scratchpad memory is $d(\text{asymmetric}) \approx 2^8 T^2 B$ When employing symmetric allocation of the scratchpad memory to tiles of matrices A, B, and C, the following holds true:

$S_X = S_{SM}/3 (X = A, B, C)$

Assuming square tiles, $r_X = c_X = \sqrt{S_X}$

Applying Equation 15, the total DRAM traffic for symmetric allocation of the scratchpad memory is $d(\text{symmetric}) \approx 1.84 \times 2^8 T^2 B$.

Thus, in Example 2, it is clear that the DRAMM traffic for symmetric allocation d(symmetric) is clearly worse than the DRAM traffic for asymmetric allocation, d(asymmetric).

Transposing Tiles for Efficient Matrix Multiplication

Thus far, it has been assumed that all matrices involved in the matrix multiplications are laid out in memory in a row-major fashion. But matrix-matrix multiplication requires a series of dot products between rows of matrix A and columns of matrix B. Thus, when a tile of matrix A and a tile of B is brought into the scratchpad memory to perform the multiplication between a row of the tile of matrix A with a column of the tile of matrix B, there will be non-contiguous memory access of elements of the tile of matrix due to the row-major storage of the tile in the scratchpad memory.

Thus, in any matrix multiplication algorithm, when the tile of matrix B is stored in row-major format, additional instructions are required to index into the tile of matrix B. Since the actual dot product occurs in the inner most loop of the algorithm, there is a non-trivial performance degradation caused by this non-contiguous access for column elements of matrix B.

In embodiments described herein, this performance degradation is avoided during the tile-based matrix multiplication by transposing the tile of B in the scratchpad memory. This transposition of the tile of matrix A implies that a same loop index may be used to index into a tile of matrix A as well as a tile of matrix B thereby eliminating a stride computation in the innermost loop. This transposing of a tile of matrix A is a one-time cost occurrence per tile of matrix B and this cost can be viewed as amortizing over the several tiles of A that the tile of matrix B is multiplied with. Significant time efficiency is accomplished with larger sizes of matrix A.

Multi-Core Processor and Scratchpad Memory

A multi-core hardware processor (also referred to herein as a multi-core processor) comprise multiple core processors on the same chip, each core processor ("core") being capable of separately executing a machine code instruction within the same clock cycles in which another of the multiple cores executes an instruction. Each core processor may be electronically coupled to a scratchpad memory that cannot be accessed by any other core processor of the multiple core processors.

Each core is coupled to registers and electronically configured to execute an instruction set based on the registers. Instructions from the set when executed by the core cause the core to generate a result using data in one or more registers as input, and to store the result in one of the registers. Some instructions in the instruction set, when executed by a core, cause the data to read from addressable memory to a register and/or to store data from a register to addressable memory. Addressable memory is memory which can be referenced by an instruction in the set (e.g. by referring to a register holding a memory address) and which, when executed by a core, causes the core to load data from that memory address to a register or store data from a register to that address. Addressable memory includes scratchpad memory or main memory. Addressable memory may be referred to herein as software-managed memory because instructions in the set may explicitly reference these addresses.

A scratchpad memory, also known as a scratchpad RAM or a software-managed cache, refers to a high-speed addressable internal memory used for temporary storage of small data for rapid retrieval. Similar to an L1 cache, a scratchpad memory is positioned close to the core registers, and offer rapid retrieval of data stored within. A scratchpad memory stores temporary results generated mid-computation by the core, results that may often not need to be committed to main memory. Thus, they differ from cache memory in that scratchpad memory data is not always copied into main memory. Furthermore, unlike typical cache management, which is performed by the hardware, scratchpad memory management is under the control of software instructions. This makes using a scratchpad memory preferable to L1 caches in applications where predictable timing is desirable, such as in real-time application.

In some architectures that employ cache control instructions, a cache may be made to behave like a scratchpad memory. Embodiments described herein are applicable using both scratchpad memories under programmer control or cache systems that can be made to behave like a scratchpad memory providing programmer control for objects stored in the cache.

Software Overview

Figure 3:
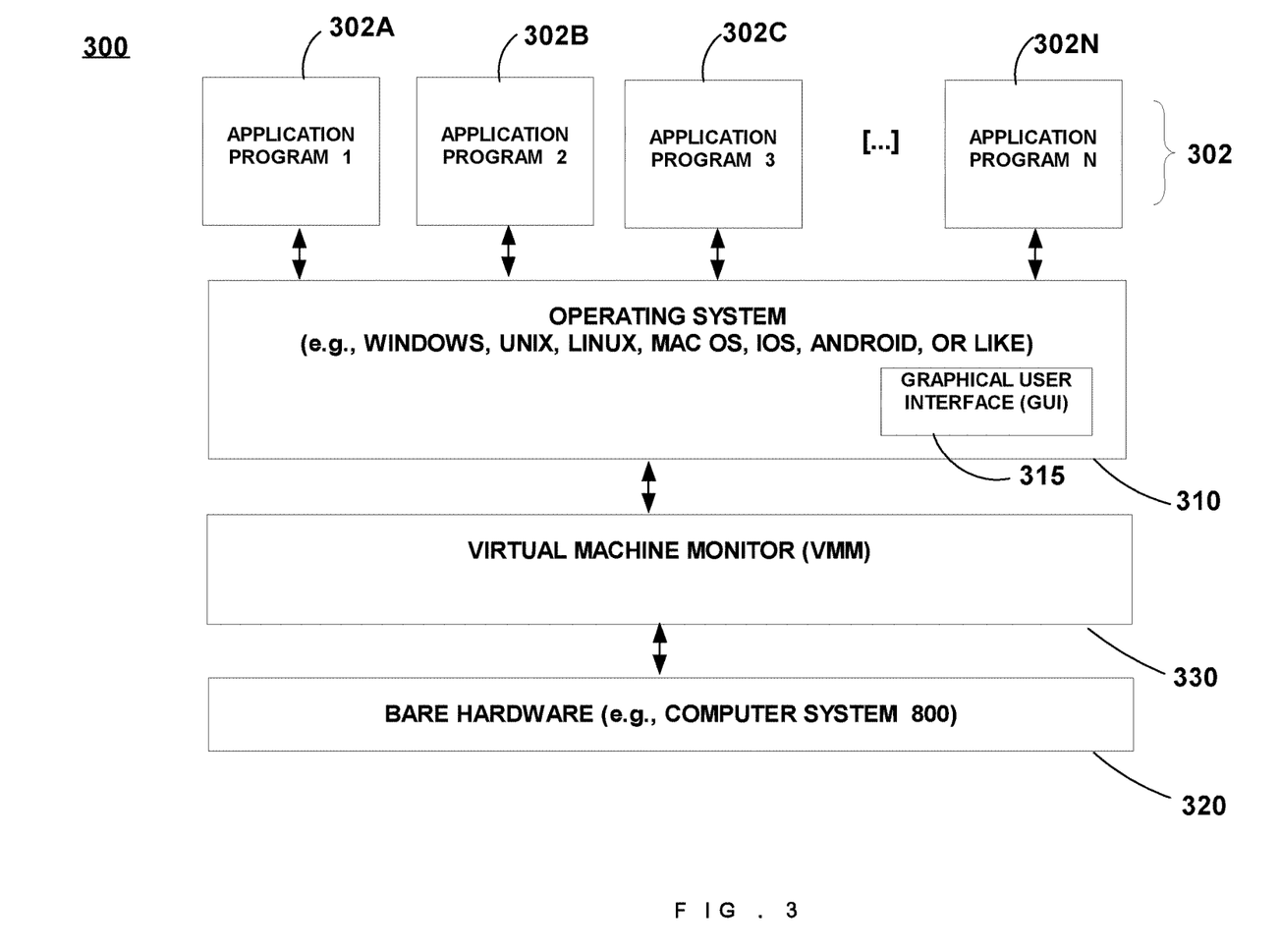
FIG. 3 is a diagram depicting a software system that may be used in an embodiment.
Figure 4:
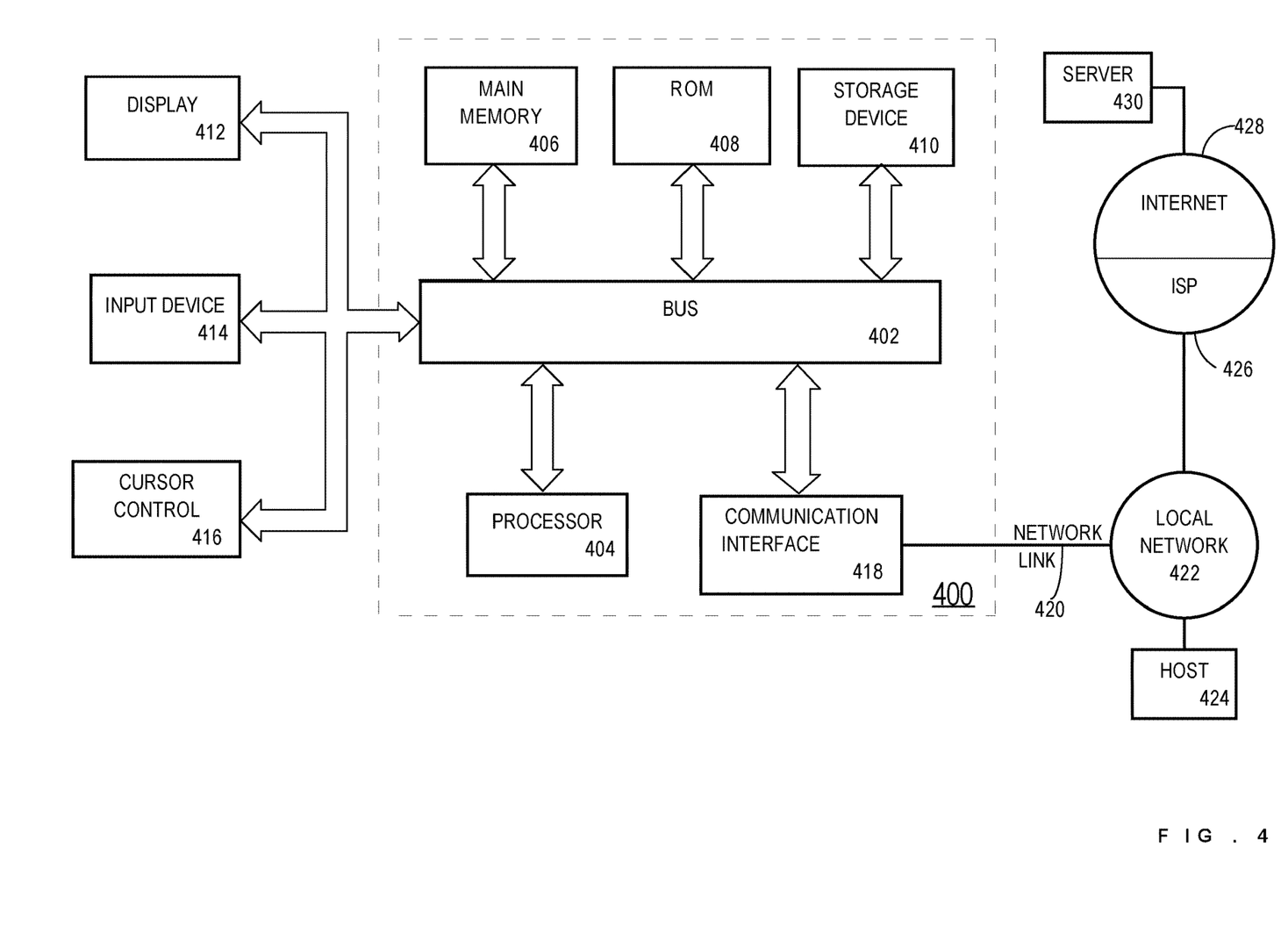
FIG. 4 is a diagram depicting a computer system that may be used in an embodiment.

FIG. 3 is a block diagram of a basic software system 300 that may be employed for controlling the operation of computing system 400 of FIG. 4. Software system 300 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 300 is provided for directing the operation of computing system 400. Software system 300, which may be stored in system memory (ROM) 408 and on fixed storage (e.g., hard disk or flash memory) 410, includes a kernel or operating system (OS) 310.

The OS 310 manages low-level aspects of computer operation, including managing execution of processes, memory allocation, file input and output (I/O), and device I/O. One or more application programs, represented as 302A, 302B, 302C . . . 302N, may be "loaded" (e.g., transferred from fixed storage 410 into memory 406) for execution by the system 300. The applications or other software intended for use on computer system 400 may also be stored as a set of downloadable computer-executable instructions, for example, for downloading and installation from an Internet location (e.g., a Web server, an app store, or other online service).

Software system 300 includes a graphical user interface (GUI) 315, for receiving user commands and data in a graphical (e.g., "point-and-click" or "touch gesture") fashion. These inputs, in turn, may be acted upon by the system 300 in accordance with instructions from operating system 310 and/or application(s) 302. The GUI 315 also serves to display the results of operation from the OS 310 and application(s) 302, whereupon the user may supply additional inputs or terminate the session (e.g., log off).

OS 310 can execute directly on the bare hardware 320 (e.g., processor(s) 404) of computer system 400. Alternatively, a hypervisor or virtual machine monitor (VMM) 330 may be interposed between the bare hardware 320 and the OS 310. In this configuration, VMM 330 acts as a software "cushion" or virtualization layer between the OS 310 and the bare hardware 320 of the computer system 400.

VMM 330 instantiates and runs one or more virtual machine instances ("guest machines"). Each guest machine comprises a "guest" operating system, such as OS 310, and one or more applications, such as application(s) 302, designed to execute on the guest operating system. The VMM 330 presents the guest operating systems with a virtual operating platform and manages the execution of the guest operating systems.

In some instances, the VMM 330 may allow a guest operating system to run as if it is running on the bare hardware 320 of computer system 400 directly. In these instances, the same version of the guest operating system configured to execute on the bare hardware 320 directly may also execute on VMM 330 without modification or reconfiguration. In other words, VMM 330 may provide full hardware and CPU virtualization to a guest operating system in some instances.

In other instances, a guest operating system may be specially designed or configured to execute on VMM 330 for efficiency. In these instances, the guest operating system is "aware" that it executes on a virtual machine monitor. In other words, VMM 330 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 46 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Computing Nodes and Clusters

A computing node is combination of one or more hardware processors that each share access to a byte addressable memory. Each hardware processor is electronically coupled to registers on the same chip of the hardware processor and is capable of executing an instruction that references a memory address in the addressable memory and that causes the hardware processor to load data at that memory address into any of the registers. In addition, a hardware processor may have access to its separate exclusive memory that is not accessible to other processors. The one or more hardware processors may be running under the control of the same operating system A hardware processor may be comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that each communicate with each other via a network. Each node in a cluster may be coupled to a network card or a network integrated circuit on the same board of the computing node. Network communication between any two nodes occurs via the network card or network integrated circuit on one of nodes and a network card or network integrated circuit of another of the nodes. The network may be configured to support remote direct memory access.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    storing in main memory at least a portion of a left matrix A and a right matrix B, wherein matrix A has m rows and n columns, and matrix B has n rows and p columns;
    wherein said main memory is coupled to a multi-core processor comprising a plurality of core processors and a plurality of scratchpad memories, wherein each scratchpad memory of said plurality of scratch memories is accessible and private to one respective core processor of said plurality of core processors, wherein said plurality of scratchpad memories include a particular scratchpad memory that accessible and private to a particular core processor of said plurality of core processors;
    determining to allocate, in the particular scratchpad memory of the particular core processor:
        an amount of memory space for one or more tiles of matrix A,
        in response to determining that matrix B can fit entirely into the particular scratchpad memory, an amount of memory space for all of matrix B,
        an amount of memory space for one or more tiles of dot product matrix C,
        wherein said amount determined for said memory space for all of matrix B is different than least one of:
            said amount determined of said memory space for said one or more tiles of matrix A, and
            said amount determined for said memory space for said one or more tiles of matrix C;
    said particular core processor performing a dot product matrix multiplication involving said one or more tiles of matrix A and corresponding one or more tiles of matrix B, wherein dot product values are stored in corresponding said one or more tiles of matrix C, wherein performing said dot product matrix multiplication includes accessing, in said particular scratchpad memory:
        said one or more tiles of matrix A,
        corresponding said one or more tiles of matrix B, and
        corresponding said one or more tiles of matrix C to store said dot product values;
    writing out the dot product values into main memory.

2. The method of claim 1, wherein an amount of said memory space for said one or more tiles of matrix A and an amount of said memory space for all of matrix B are each at least equal to a peak bandwidth in size.

3. The method of claim 2, wherein, performing the dot product matrix multiplication comprises:
reading matrix B entirely into the particular scratchpad memory;
for each particular row of matrix A, repeating over the m rows of matrix A,
for each of consecutive $C_A$ columns of the particular row matrix A, repeating n/$C_A$ times, reading $C_A$ columns of matrix A into the particular scratchpad memory;
for each particular column of matrix B, repeating over the p columns of matrix B determining a dot product of the $C_A$ column values of matrix A with $C_A$ corresponding elements of the particular column of matrix B to obtain at least a partial value for corresponding element of matrix C;
updating the corresponding element of matrix C in the allocated memory space for said one or more tiles of matrix C based on the obtained at least partial value;
writing a completed row of matrix C to main memory.

4. The method of claim 3, wherein each element of matrix A and matrix B are read only once into the particular scratchpad memory, and each element of the dot product matrix C is written out only once into main memory.

5. One or more non-transitory storage media storing sequences of instructions, which when executed by one or more computing devices cause:
storing in main memory at least a portion of a left matrix A and a right matrix B, wherein matrix A has m rows and n columns, and matrix B has n rows and p columns;
wherein said main memory is coupled to a multi-core processor comprising a plurality of core processors and a plurality of scratchpad memories, wherein each scratchpad memory of said plurality of scratch memories is accessible and private to one respective core processor of said plurality of core processors, wherein said plurality of scratchpad memories include a particular scratchpad memory that accessible and private to a particular core processor of said plurality of core processors;
determining to allocate, in the particular scratchpad memory of the particular core processor:
an amount of memory space for one or more tiles of matrix A,
in response to determining that matrix B can fit entirely into the particular scratchpad memory, an amount of memory space for all of matrix B,
an amount of memory space for one or more tiles of dot product matrix C,
wherein said amount determined for said memory space for all of matrix B is different than least one of:
said amount determined of said memory space for said one or more tiles of matrix A, and
said amount determined for said memory space for said one or more tiles of matrix C;
said particular core processor performing a dot product matrix multiplication involving said one or more tiles of matrix A and corresponding one or more tiles of matrix B, wherein dot product values are stored in corresponding said one or more tiles of matrix C, wherein performing said dot product matrix multiplication includes accessing, in said particular scratchpad memory:
said one or more tiles of matrix A,
corresponding said one or more tiles of matrix B, and
corresponding said one or more tiles of matrix C to store said dot product values;
writing out the dot product values into main memory.

6. The non-transitory computer-readable storage medium of claim 5, wherein an amount of said memory space for said one or more tiles of matrix A and an amount of said memory space for all of matrix B are each at least equal to a peak bandwidth in size.

7. The non-transitory computer-readable storage medium of claim 6, wherein, performing the dot product matrix multiplication comprises:
reading matrix B entirely into the particular scratchpad memory;
for each particular row of matrix A, repeating over the m rows of matrix A,
for each of consecutive $C_A$ columns of the particular row matrix A, repeating n/$C_A$ times, reading $C_A$ columns of matrix A into the particular scratchpad memory;
for each particular column of matrix B, repeating over the p columns of matrix B
determining a dot product of the $C_A$ column values of matrix A with $C_A$ corresponding elements of the particular column of matrix B to obtain at least a partial value for corresponding element of matrix C;
updating the corresponding element of matrix C in the allocated memory space for said one or more tiles of matrix C based on the obtained at least partial value;
writing a completed row of matrix C to main memory.

8. The non-transitory computer-readable storage medium of claim 7, wherein the sequences of instructions include instructions that, when executed by said one or more computing devices, cause each element of matrix A and matrix B to be read only once into the particular scratchpad memory, and each element of the dot product matrix C to be written out only once into main memory.

\* \* \* \* \*

UNITED STATES PATENT AND TRADEMARK OFFICE
CERTIFICATE OF CORRECTION

PATENT NO. : 11,138,291 B2
APPLICATION NO. : 15/716225
DATED : October 5, 2021
INVENTOR(S) : Chadha et al.

It is certified that error appears in the above-identified patent and that said Letters Patent is hereby corrected as shown below:

On the Title Page

Column 1, under Title, Line 1, delete "ASSYMETRIC" and insert -- ASYMMETRIC --, therefor.

In the Drawings

On Sheet 2 of 4, in FIG. 2, and On the Title Page, under Reference Numeral 204, Line 1, delete "ASSYMMETRIC" and insert -- ASYMMETRIC --, therefor.

On sheet 3 of 4, in FIG. 3, Line 14, delete "F I G . 3" and insert -- FIG. 3 --, therefor.

On sheet 4 of 4, in FIG. 4, Line 13, delete "F I G . 4" and insert -- FIG. 4 --, therefor.

In the Specification

In Column 1, Line 1, delete "ASSYMETRIC" and insert -- ASYMMETRIC --, therefor.

In Column 2, Line 64, delete "$A_{ik}\ B_{kj}$," and insert -- $A_{ik}B_{kj}$, --, therefor.

In Column 5, Line 15, delete "$S_B S_A + S_C$" and insert -- $S_B + S_A + S_C$ --, therefor.

In Column 8, Lines 6-7, delete "$\frac{r_A c_M}{r_C c_C}$" and insert -- $\frac{r_A c_B}{r_C c_C}$ --, therefor.

In Column 8, Line 60, delete "$r_B = 2:1$." and insert -- $r_B : c_B = 2:1$. --, therefor.

In Column 8, Line 62, delete "that that" and insert -- that --, therefor.

Signed and Sealed this
Sixth Day of February, 2024

*Katherine Kelly Vidal*
Katherine Kelly Vidal
*Director of the United States Patent and Trademark Office*

CERTIFICATE OF CORRECTION (continued)
U.S. Pat. No. 11,138,291 B2

In Column 10, Line 22, delete "received" and insert -- received. --, therefor.

In Column 11, Line 34, delete "K B." and insert -- KB. --, therefor.

In Column 11, Line 58, delete "DRAMM" and insert -- DRAM --, therefor.

In Column 13, Line 30, delete "302C" and insert -- 302C, --, therefor.

In Column 17, Line 8, delete "system" and insert -- system. --, therefor.

In Column 17, Line 9, delete "may be" and insert -- may --, therefor.

In the Claims

In Column 19, Line 9, in Claim 3, delete "$C_A$" and insert -- $c_A$ --, therefor.

In Column 19, Line 10, in Claim 3, delete "$n/C_A$" and insert -- $n/c_A$ --, therefor.

In Column 19, Line 10, in Claim 3, delete "$C_A$" and insert -- $c_A$ --, therefor.

In Column 19, Line 15, in Claim 3, delete "$C_A$" and insert -- $c_A$ --, therefor.

In Column 19, Line 15, in Claim 3, delete "$C_A$" and insert -- $c_A$ --, therefor.

In Column 19, Line 27, in Claim 5, delete "storage media" and insert -- computer-readable storage medium --, therefor.

In Column 20, Line 29, in Claim 7, delete "$C_A$" and insert -- $c_A$ --, therefor.

In Column 20, Line 30, in Claim 7, delete "$n/C_A$" and insert -- $n/c_A$ --, therefor.

In Column 20, Line 30, in Claim 7, delete "$C_A$" and insert -- $c_A$ --, therefor.

In Column 20, Line 34, in Claim 7, delete "$C_A$" and insert -- $c_A$ --, therefor.

In Column 20, Line 35, in Claim 7, delete "$C_A$" and insert -- $c_A$ --, therefor.